US007105230B2

(12) United States Patent
Dupuis et al.

(10) Patent No.: US 7,105,230 B2
(45) Date of Patent: Sep. 12, 2006

(54) COMPOSITE MATERIAL BASED ON POLYAMIDE AND SUBMICRONIC MINERAL PARTICLES

(75) Inventors: Dominique Dupuis, Crepy en Valois (FR); Patrice Lacombe, Santo André (BR); Joël Varlet, Dardilly (FR)

(73) Assignee: Rhodia Chimie, Aubervilliers (FR)

( * ) Notice: Subject to any disclaimer, the term of this patent is extended or adjusted under 35 U.S.C. 154(b) by 0 days.

(21) Appl. No.: 10/257,318

(22) PCT Filed: Mar. 21, 2001

(86) PCT No.: PCT/FR01/00844

§ 371 (c)(1),
(2), (4) Date: Mar. 25, 2003

(87) PCT Pub. No.: WO01/72889

PCT Pub. Date: Oct. 4, 2001

(65) Prior Publication Data

US 2003/0157331 A1 Aug. 21, 2003

(51) Int. Cl.
*B32B 17/02* (2006.01)

(52) U.S. Cl. ...................... 428/403; 428/404; 428/407; 523/200; 523/216; 524/492; 524/493; 524/847

(58) Field of Classification Search ................ 428/403, 428/404, 407; 523/200, 216; 524/492, 493, 524/847

See application file for complete search history.

(56) References Cited

U.S. PATENT DOCUMENTS

| | | | | |
|---|---|---|---|---|
| 3,419,517 | A * | 12/1968 | Hedrick et al. | 523/213 |
| 3,843,591 | A * | 10/1974 | Hedrick et al. | 523/212 |
| 4,705,675 | A | 11/1987 | Desmond et al. | |
| 5,512,094 | A * | 4/1996 | Linton | 106/409 |
| 5,846,310 | A * | 12/1998 | Noguchi et al. | 106/482 |
| 5,962,608 | A * | 10/1999 | Ryang et al. | 526/89 |

FOREIGN PATENT DOCUMENTS

| | | |
|---|---|---|
| FR | 1 134 479 | 4/1957 |
| GB | 1 222 955 | 2/1971 |
| WO | WO 94/22962 | 10/1994 |

* cited by examiner

*Primary Examiner*—Monique R. Jackson
(74) *Attorney, Agent, or Firm*—Buchanan Ingersoll & Rooney, PC

(57) ABSTRACT

The invention relates to a composite material comprising a polyamide matrix and mineral fillers of submicron size. The filler used comprises at least one core and a surface layer for modifying its dispersibility in the matrix or in the medium for synthesizing the matrix. The filler allows the thermomechanical properties of the polyamide to be modified.

17 Claims, No Drawings

COMPOSITE MATERIAL BASED ON POLYAMIDE AND SUBMICRONIC MINERAL PARTICLES

The present invention relates to a polyamide-based composite material comprising mineral submicron particles.

In order to modify the thermomechanical properties of polymers, it is known practice to combine them with fillers. A large number of fillers intended, for example, to modify the rheology of the materials, the rigidity, the impact strength, the ductility, the light-fastness, the heat resistance, the fire resistance, the hardness, etc. is available to do this. The choice of fillers and polymers is made depending on the application for which the material is intended. As a very general example, it is known practice to reinforce thermoplastic resins with glass fibres to increase their rigidity.

Efforts are continuously being made to develop the number of materials which may be made available and to improve their properties. Thus, new fillers may be designed in order, for example, to modify a compromise between several properties. Another route of development consists in making a filler compatible with novel thermoplastic matrices, or in making it possible to incorporate this filler into thermoplastic matrices.

Thus, French patent FR 1 134 479 discloses a composite material comprising a matrix based on polyamide-6 and a finely divided siliceous filler. The material is made by adding an aqueous dispersion of silica particles to the monomer (caprolactam) polymerization medium. The material has improved rigidity while preserving its ductility, which distinguishes it, for example, from a material reinforced with glass fibres. However, this type of material cannot be made with a polyamide-6,6 matrix. The reason for this is that aqueous silica dispersions are unstable in a medium comprising hexamethylene diammonium adipate. The silica particles flocculate and it is therefore impossible to obtain a dispersion of these particles in the polyamide-6,6 matrix.

A first solution, proposed in the abovementioned patent, consists in greatly diluting the medium containing the hexamethyleneammonium adipate salt, also known as N salt. This solution is economically disadvantageous since it requires the evaporation of large volumes of water. Another solution may consist in using surfactants to stabilize the particle dispersion. This solution poses problems of foaming during the polymerization phase.

One object of the present invention is to propose a filler, consisting of mineral particles, which may be used in particular to prepare polyamide-based composite materials, and a process for preparing such materials.

To this end, a first subject of the invention is a composite material comprising a matrix based on polyamide and on mineral submicron particles, characterized in that the polyamide is obtained by polycondensation of a diamine with a dicarboxylic acid, and in that the particles comprise a silica-based core and an at least discontinuous layer of an oxide, hydroxide or hydrated oxide of a metal, whose isoelectric point is greater than that of the core.

A second subject of the invention is a process for preparing a composite material comprising a polyamide matrix obtained by polycondensation of a diamine with a dicarboxylic acid and mineral submicron particles, characterized in that it comprises the following steps:

a) introduction of the particles, comprising a core and an at least discontinuous layer of an oxide, hydroxide or hydrated oxide of a metal, whose isoelectric point is higher than that of the core, into an aqueous solution comprising a salt of the diamine and of the dicarboxylic acid,
b) polycondensation of the polyamide to the desired degree of polymerization.

The silica-based core of the submicron particles of the first subject of the invention is a particle of substantially spherical or platelet form. It may consist, for example, of a silica in platelet form.

The particles of the first subject of the invention comprise at the surface an at least discontinuous layer of a compound whose isoelectric point is higher than that of the core. This compound is preferably deposited directly onto the core. However, the particles may comprise one or more other layers which modify the properties of the core or which give the particles additional properties such as UV protection or bioactivity. The compound whose isoelectric point is higher than that of the core is thus deposited on the outer intermediate layer.

The surface layer of the particles of the first subject of the invention may cover the entire surface of the core or of the outer intermediate layer. This layer then constitutes a layer encapsulating the core with, optionally, the intermediate layers. The surface layer may also only partially cover the surface of the core or of the intermediate layers. In this case, it is discontinuous, which is the case especially when several point-specific deposits are made at the surface. The form which the surface layer takes generally depends on the compounds used, the process for producing the layer and the amount of material deposited. The surface layer may constitute from 1% to 50% by weight of the total mass of the particle.

As examples of compounds which may be suitable for forming the surface layer, mention may be made of alumina hydrates, zirconia and magnesia.

The particles of the first subject of the invention are preferably substantially spherical, the mean diameter of these particles being less than 500 nm. The mean diameter is preferably less than 200 nm and even more preferably less than 100 nm.

The surface layer which is preferred for the particles of the first subject of the invention is formed from zirconia. The silica-based core may be, for example, a silica particle of the type obtained by the "Stöber" route, starting with ethyl silicate, or via the "precipitation" route, starting with an alkaline silicate.

The preferred particles of the first subject of the invention are particles whose core is based on silica and whose surface layer is a discontinuous layer formed from an oxide, hydroxide or hydrated oxide of zirconium. The weight proportion of zirconium in the compound relative to the total weight of the particles is preferably between 15% and 25%. The particles are preferably substantially spherical, with a mean diameter of less than 500 nm.

The particles of the first subject of the invention are generally conditioned in the form of a sol, for example an aqueous or glycolic sol.

These particles may be obtained according to the following process:

Step 1: Dispersion of silica particles in an aqueous medium of high ionic strength such that the particles do not flocculate.

Step 2: Precipitation of a salt of a metal oxide or of a metal hydroxide, the salt being introduced gradually into the dispersion medium and the pH of the medium being adjusted such that the oxide or hydroxide precipitates.

Step 3: Simultaneous or subsequent removal of the soluble salts resulting from the precipitation reaction, such that the particles do not flocculate. This removal may be carried out, for example, by ultra-filtration, electrodialysis or diafiltration. The conductivity limit of the medium above which flocculation is observed is about 15 mS.

In the first step, silica particles are dispersed in an aqueous medium. The ionic strength of the dispersion medium should be low enough for the particles not to flocculate. The medium should, for example, be sufficiently diluted. According to a first embodiment, the particles are introduced in powder form, optionally with other compounds, into water. According to a second embodiment, the particles are introduced into water in the form of a concentrated sol.

The second step is a step of precipitation of a compound which modifies the surface of the silica particles. The compound is a metal oxide obtained, for example, by precipitation using a metal oxide or metal hydroxide salt. As examples of compounds which may be used as metal oxide precursors, mention may be made of sodium aluminate, zirconium oxychloride and magnesium chloride. During this operation, the pH is generally adjusted to values such that the precipitation reaction takes place, for example by adding an acid or a base. Specifically, the precipitation reaction may generate side products which modify the pH of the medium, thereby possibly interrupting the precipitation reaction.

The pH is generally adjusted by adding a basic or acidic solution. It modifies the ionic strength of the medium. When this modification becomes large, it causes flocculation of the silica particles. It is thus necessary to control the ionic strength of the medium by either continuous or subsequent removal of the ions introduced into the solution to adjust the pH or produced during the precipitation step.

The ionic strength is reduced by removing the salts resulting from the precipitation reaction, for example by diafiltration or ultrafiltration.

The particles or dispersions containing these particles described above are suitable for use in composite materials comprising a polyamide-based matrix which are obtained by polycondensation of a diamine with a dicarboxylic acid.

However, they may be used as fillers in other polymers and more particularly in other thermoplastic polymers chosen, for example, from polyamides, polyesters, vinyl polymers, polyolefins and polyacetal. As examples of polyamides which may be used, mention may be made of the products of polymerization of lactams or of amino acids corresponding to the lactams, for example polyamide-4, polyamide-6, polyamide-11 or polyamide-12, blends comprising these polyamides and copolymers based on these polyamides.

The polyamide matrices of the first subject of the invention are chosen from the products of condensation of one or more diamines with one or more carboxylic acids. The diamines are chosen, for example, from aliphatic diamines such as hexamethylenediamine, trimethylhexamethylenediamine and 2-methylpentamethylenediamine. The dicarboxylic acids are chosen, for example, from aliphatic-chain dicarboxylic acids such as adipic acid, aromatic dicarboxylic acids such as terephthalic acid or isophthalic acid, arylaliphatic dicarboxylic acids and acid dimers. Examples of preferred polyamides which may be mentioned are polyamide-6,6, polyamide-4,6, polyamide-6,9, polyamide-6,10, polyamide-6,36, polyamide-6T, blends comprising these polyamides and copolymers based on these polyamides.

The composite material may comprise from 0.1% to 20% by weight of mineral submicron particles.

In addition to the particles, the composite material may comprise other additives such as, for example, stabilizers, plasticizers, flame retardants, colorants or lubricants. This list is not limiting in nature. The particles may also be combined with other reinforcing additives such as resilience modifiers, for instance optionally grafted elastomers, mineral reinforcers such as clays, kaolin and fibrous reinforcers such as glass fibres, aramid fibres, carbon fibres and ceramic fibres.

The composite material according to the first subject of the invention may be obtained by any known process for incorporating particles into a thermoplastic polymer. A first embodiment consists in incorporating the particles in powder form into the polymer during an extrusion operation. A second embodiment consists in incorporating the particles into the polymer with the aid of a masterbatch, i.e. a compound comprising a thermoplastic matrix and particles in high concentration. The masterbatch is moreover also a composition according to the invention.

However, another subject of the invention, the second subject, lies in a process for preparing such composite materials by adding particles to the medium comprising the monomers of the polymer to be prepared. The polymer according to the second subject of the invention is a polyamide.

This process is applied particularly when the polyamide is derived from the polycondensation of a diamine and of a diacid and when the medium containing the monomers is an aqueous solution of a salt of diamine and of diacid. The reason for this is that the addition of submicron fillers to such a medium causes considerable flocculation, thus making such an addition impossible.

Thus, in the current processes, the fillers are incorporated during the polycondensation when most of the water and salt has disappeared.

With the aim of limiting the flocculation phenomenon described above, the second subject of the invention is a process for preparing a composite material comprising a matrix obtained by polycondensation of a diamine with a dicarboxylic acid and mineral submicron particles, characterized in that it comprises the following steps:

a) introduction of particles, comprising a core and an at least discontinuous layer of an oxide, hydroxide or hydrated oxide of a metal, whose isoelectric point is higher than that of the core, into an aqueous solution comprising a salt of the diamine and of the dicarboxylic acid,
b) polycondensation of the polyamide to the desired degree of polymerization.

The core in the second subject of the invention is a particle of substantially spherical or platelet shape. It may consist, for example, of a silica in platelet form. The core is advantageously based on a compound chosen from titanium oxide, aluminium oxide, zinc oxide, copper oxide, calcium sulphate, strontium sulphate, barium sulphate, zinc sulphide, zeolites, talc, kaolin, mullite and silica.

Everything which has been disclosed hereinabove regarding the surface layer for the silica particles according to the first subject of the invention applies identically herein for the particles according to the second subject of the invention, irrespective of the nature of the core.

The particles of the second subject of the invention are preferably substantially spherical, the mean diameter of these particles being less than 500 nm. The mean diameter is preferably less than 200 nm and even more preferably less than 100 nm.

To prepare the composite material according to the second subject of the invention, the particles may be introduced in the form of powder or of a dispersion, for example in water. They are preferably introduced in the form of a sol, preferably an aqueous sol. In addition to the particles, the sol may contain additives intended to stabilize it and/or additives intended to form a part of the compositions for which the particles are used. As examples of such additives, mention may be made of catalysts, light-stabilizers or heat-stabilizers.

The process according to the second subject of the invention is particularly advantageous.

Specifically, according to this process, the particles do not flocculate when they are introduced into the aqueous medium containing the salt.

The polyamide matrices according to the second subject of the invention are chosen from the products of condensation of one or more diamines with one or more dicarboxylic acids. The diamines are chosen, for example, from aliphatic diamines such as hexamethylenediamine, trimethylhexamethylenediamine and 2-methylpentamethylenediamine. The dicarboxylic acids are chosen, for example, from aliphatic-chain dicarboxylic acids such as adipic acid, aromatic dicarboxylic acids such as terephthalic acid or isophthalic acid, arylaliphatic dicarboxylic acids and acid dimers. Examples of preferred polyamides which may be mentioned are polyamide-6,6, polyamide-4,6, polyamide-6,9, polyamide-6,10, polyamide-6,36, polyamide-6T, blends comprising these polyamides and copolymers based on these polyamides.

The composite material according to the second subject of the invention may comprise from 0.1% to 20% by weight of mineral submicron particles.

In addition to the particles, the composite material according to the second subject of the invention may comprise other additives such as, for example, stabilizers, plasticizers, flame retardants, colorants or lubricants. This list is not limiting in nature. The particles may also be combined with other reinforcing additives such as resilience modifiers, for instance optionally grafted elastomers, mineral reinforcers such as clays, kaolin and fibrous reinforcers such as glass fibres, aramid fibres, carbon fibres and ceramic fibres.

The polycondensation according to the invention comprises the steps of evaporation of the water and melt polycondensation. They are carried out according to the usual processes for manufacturing polyamide-6,6. The salt concentration in the aqueous solution is generally between 50% and 70%.

The monomers for obtaining the polymer according to the invention are mainly a dicarboxylic acid and a diamine, which are introduced in the form of salt, for example a hexamethylenediammonium adipate. In addition to these difunctional monomers, monofunctional comonomers (chain limiters) and difunctional or multi-functional comonomers, with a number of functions greater than or equal to 3, may be used. An example of a difunctional comonomer which may be used is caprolactam. The use of a monofunctional comonomer may be advantageous in order to control the polycondensation reaction kinetics and to avoid any phenomena of setting to a solid inside the polymerization reactor. As examples of monofunctional comonomers which may be suitable for such a control, mention may be made of monocarboxylic acids, for instance acetic acid.

The composite material according to the invention may be shaped in the form of granules. This shaping generally consists in casting the molten material through an orifice in order to form a rod, cooling it and then forming granules by chopping up the rods. However, the composition may be fed directly into injection-moulding, moulding or spinning installations for producing moulded articles or yarns, fibres of filaments.

The composite material according to the invention may be used to manufacture moulded, extruded or spun articles. It may be used, for example, in the field of technical plastics to prepare components intended to be used in the sports, motor vehicle or electricity sectors. It may be used to manufacture yarns, fibres and filaments by melt spinning. The yarns, fibres and filaments manufactured from the material according to the invention have improved abrasion resistance compared with yarns, fibres and filaments manufactured from compositions not containing submicron particles.

Examples will now be given, purely for indicative purposes and to illustrate the invention.

EXAMPLE 1

Preparation of a Dispersion of Particles in Accordance with the Invention

Starting Materials Used:

Klebosol® 30R50 (silica sol sold by the company Hoechst)

Aqueous solution of zirconium oxychloride containing 100 g/l of $ZrO_2$

Aqueous 4M sodium hydroxide solution.

Operating Conditions:

4000 g of deionized water and 800 g of Klebosol® 30R50 are introduced into an 8 litre reactor equipped with an anchor stirrer rotating at 300 rpm. The pH of the reaction medium is adjusted to 7.5 by adding a few drops of aqueous zirconium oxychloride solution. The reaction mass is heated to 60° C. and this temperature is maintained throughout the reaction. At 60° C., 240 ml of aqueous 10% $ZrOCl_2$ solution are added continuously, with the addition flow rate set at 2.5 ml/min. During the introduction of the zirconium oxychloride, the pH is kept constant by means of simultaneous introduction of sodium hydroxide (4M solution). After the introduction of the oxychloride solution is complete, the temperature is maintained at 60° C. for 1 hour. The conductivity of the reaction medium is 11.6 mS. The reaction mass is then diafiltered until a conductivity of 1.5 mS (conductivity of the permeate) is obtained. 240 ml of aqueous 10% $ZrOCl_2$ solution are then added continuously, at pH 7.5 and at 60° C., with an introduction flow rate of 2.5 ml/min. During the introduction of the zirconium oxychloride, the pH is kept constant by means of simultaneous introduction of sodium hydroxide (4M solution). After the introduction of the oxychloride solution is complete, the temperature is maintained at 60° C. for 1 hour. The $ZrO_2/SiO_2$ mass ratio is then 20%.

After cooling, the reaction mass is partially deionized by diafiltration until a conductivity of 1 mS is obtained. The dispersion is concentrated by ultra-filtration until a solids content of 15% is obtained.

Physicochemical Characteristics of the Particles:

Solids content: 14.95% (constant weight at 100° C.) pH: 7.5

Particle size measured with a scanning electron microscope: 50 to 60 nm.

Analysis by light-scattering microscopy carried out using a Nicomp machine shows that the polydispersity index of the particle size is small.

Isoelectric point: 6

Conductivity: <3 $mS/cm^2$.

The observation by transmission electron microscopy clearly shows the zirconium dioxide layer on the silica and the absence of free zirconia particles not deposited on the surface of the silica particles.

Test of Stability in the Presence of N salt: no flocculation of the dispersion thus obtained is observed after dilution to 5% and addition of 150% by weight of N salt (hexamethylenediammonium adipate) relative to the weight of the particles in the dispersion. The particle size determined by Nicomp measurement in the presence of the N salt is between 400 and 500 nm.

COMPARATIVE EXAMPLE 1

Particles not in Accordance with the Invention

A 5% dilution of a Klebosol 30R50 silica sol is prepared and 150% by weight of N salt (in the form of a solution containing 25% by mass of N salt), relative to the weight of the particles in the dispersion, are added. Immediate flocculation is observed.

EXAMPLE 2

Polymerization in the Presence of the Particles of Example 1 (polyamide-6,6)

Operating Conditions 130 g of dry N salt, 83.4 g of an aqueous suspension of submicron particles prepared according to Example 1, 49.1 g of water and 0.21 g of acetic acid are introduced into a 300 ml stirred reactor.

The polyamide-6,6 composition comprising the particles is prepared from the above solution according to the following procedure:

The N salt of the solution is concentrated by evaporating off water at atmospheric pressure until the ratio (mass of dry N salt/(mass of dry N salt+mass of water)) reaches 0.7. The evaporation is then continued at 17.5 bar until the temperature of the reaction mixture reaches 250° C. The pressure is then gradually reduced from 17.5 bar absolute to 1 bar absolute and, at the same time, the temperature is raised from 250° C. to 275° C. The temperature is maintained for 45 min at 275° C. and the polymer is then cast and granulated.

The polymer thus obtained has the following characteristics:

Weight concentration of particles in the composition: 10%

Viscosity index=138 ml/g

The viscosity index is measured at 25° C. using an Ubbelohde viscometer for a 5 g/l solution of polymer dissolved in a mixture composed of 90% by weight of formic acid and 10% of water.

Characterizations

Slices 2 μm thick and with a side length of 100 μm are prepared and are observed under a phase-contrast optical microscope. Very few aggregates are observed. The number of aggregates larger than 10 μm in size is between 0 and 3 per slice.

Slices about 0.1 μm thick are prepared. Observation by transmission electron microscopy (TEM) shows a very homogeneous dispersion: uniformly distributed individual particles with a few aggregates less than about 500 nm in size are observed.

Mechanical Behaviour

Tensile strength tests are carried out on extruded rods preconditioned for 3 days at 50% relative humidity and at 23° C. The diameter of the rods is between 0.5 and 1 mm. An Erichsen 472 tensile testing machine with a force sensor of capacity 20 dan is used to do this. The nominal stress (ratio of the force measured to the cross section evaluated by measuring the diameter with a micrometer) is reported as a function of the relative deformation applied.

The behaviour of the sample containing the nanoparticles is very similar to that of a pure polyamide-6,6 polymer: the elongation at break is greater than 100% and the stress at the yield point is in the region of 50 MPa.

The invention claimed is:

1. Composite material comprising a matrix based on polyamide and on mineral submicron particles, wherein the polyamide is obtained by polycondensation of a diamine with a dicarboxylic acid, and in that the particles comprise a silica-based core and an at least discontinuous layer of an oxide, hydroxide or hydrated oxide of zirconium, whose isoelectric point is greater than that of the core, said particles being free of a silane coupling agent.

2. Material according to claim 1, comprising between 0.1% and 20% by weight of particles.

3. Material according to claim 1, wherein the mineral particles are substantially spherical, with a diameter of less than 500 nm.

4. Material according to claim 3, wherein the mineral particles are substantially spherical, with a diameter of less than 200 nm.

5. Material according to claim 1, wherein the diamine is hexamethylenediamine.

6. Material according to claim 1, wherein the dicarboxylic acid is adipic acid.

7. Process for preparing a composite material comprising a polyamide matrix obtained by polycondensation of a diamine with a dicarboxylic acid and mineral submicron particles, comprising the following steps:

a) introducing particles, comprising a silica-based core and an at least discontinuous layer of an oxide, hydroxide or hydrated oxide of zirconium, whose isoelectric point is higher than that of the core, into an aqueous solution comprising a salt of the diamine and of the dicarboxylic acid, said particles being free of a silane coupling agent and b) polycondensing the polyamide to the desired degree of polymerization.

8. Process according to claim 7, wherein the composite material comprises between 0.1% and 20% by weight of particles.

9. Process according to claim 7, wherein the mineral particles are substantially spherical, with a diameter of less than 500 nm.

10. Process according to claim 9, wherein the mineral particles are substantially spherical, with a diameter of less than 200 nm.

11. Process according to claim 7, wherein the diamine is hexamethylenediamine.

12. Process according to claim 7, wherein the dicarboxylic acid is adipic acid.

13. Process according to claim 7, wherein the particles are introduced in the form of a sol into the aqueous solution comprising the salt of diamine and of dicarboxylic acid.

14. Process according to claim 13, wherein the sol is an aqueous sol.

15. Composite material obtained by the process according to claim 7.

16. Molded article obtained from a material prepared by the process according to claim 7.

17. Yams, fibers and filaments obtained by spinning a material prepared by the process according to claim 7.

* * * * *